Figure 1:
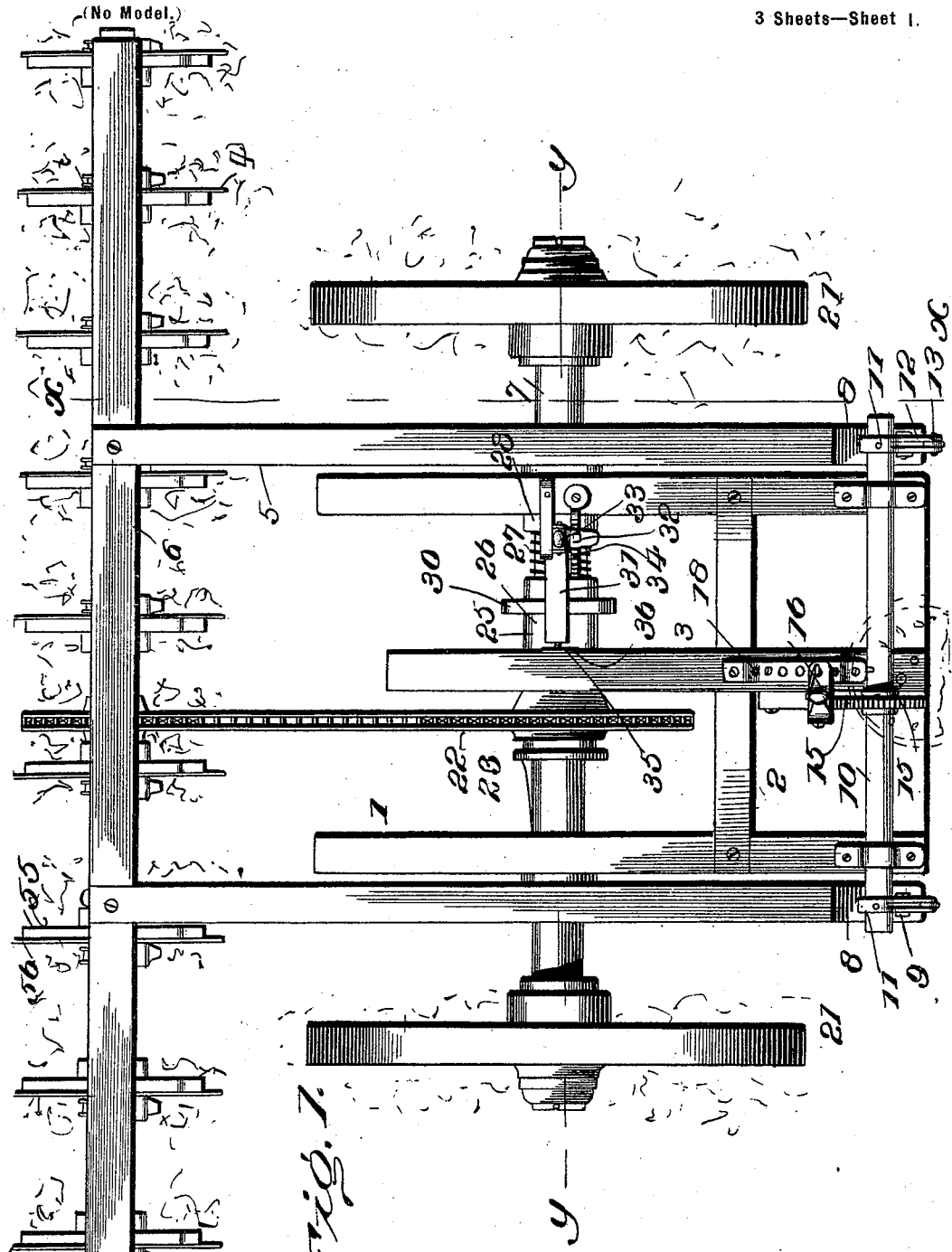

No. 642,597. Patented Feb. 6, 1900.
F. FOSNOT.
COMBINED STALK CUTTER AND RAKE.
(Application filed July 5, 1899.)
(No Model.) 3 Sheets—Sheet 1.

Witnesses
Inventor
Frank Fosnot
by R.S.&A.B. Lacey his Attorneys

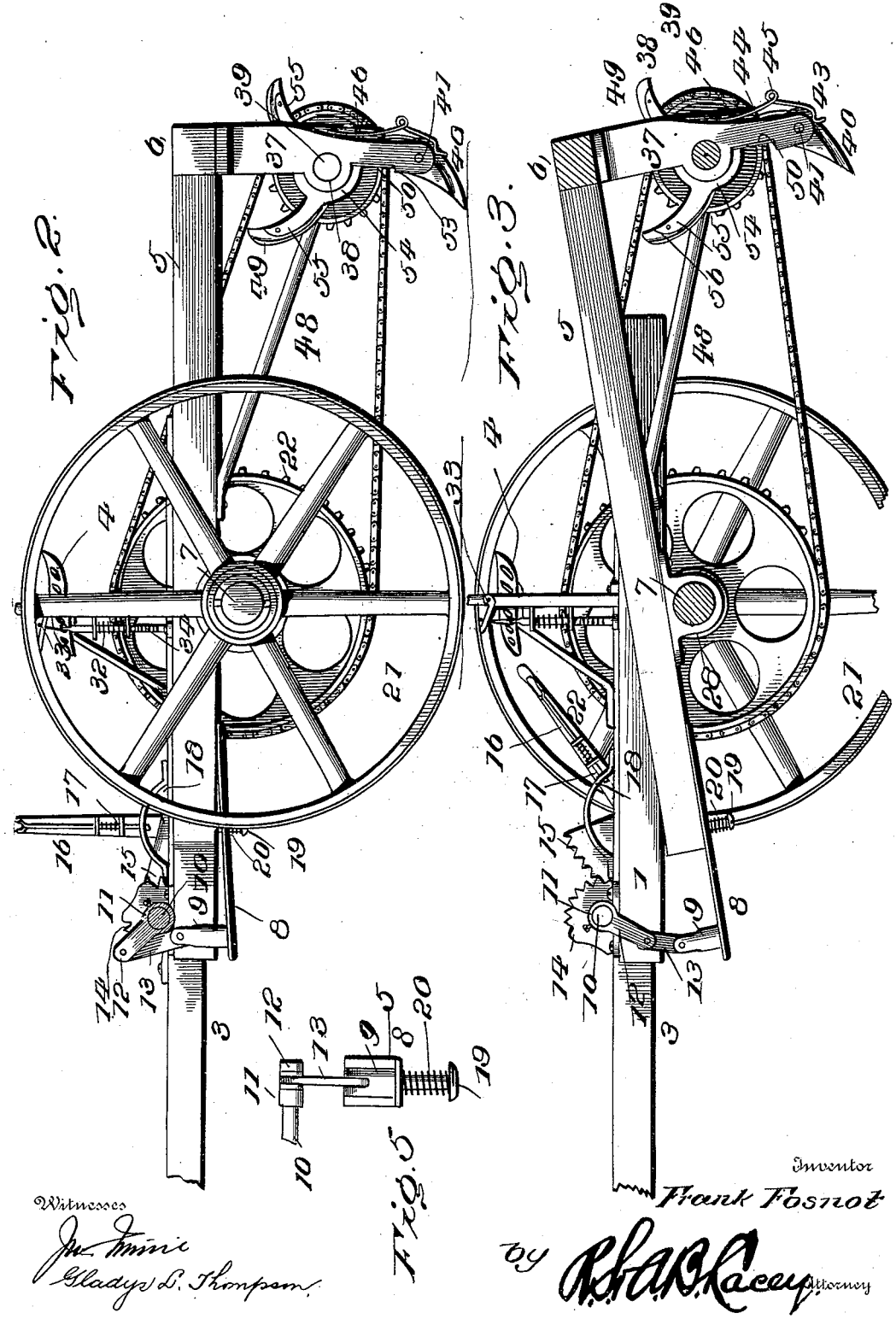

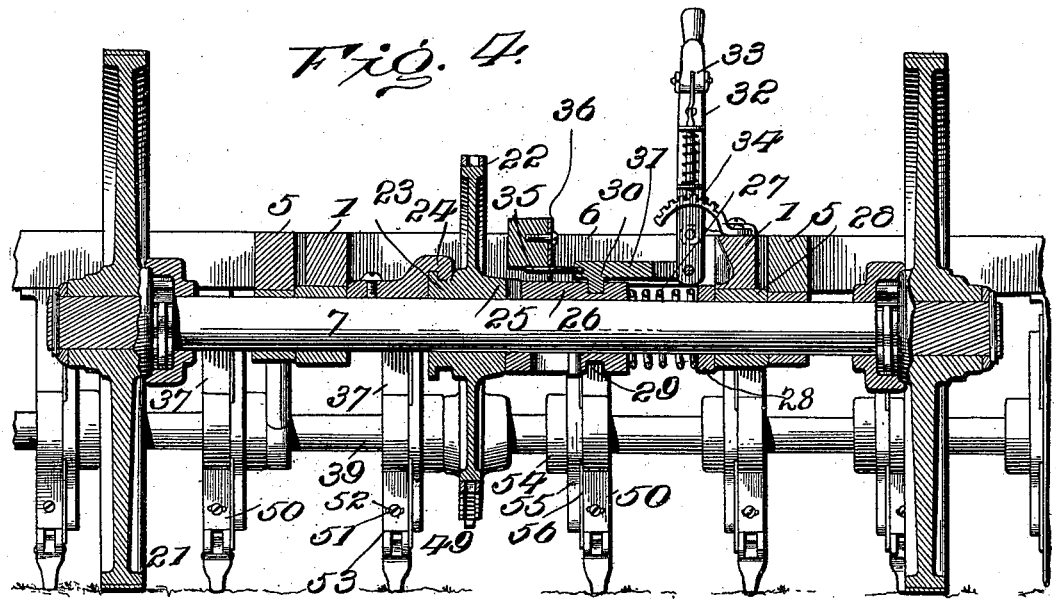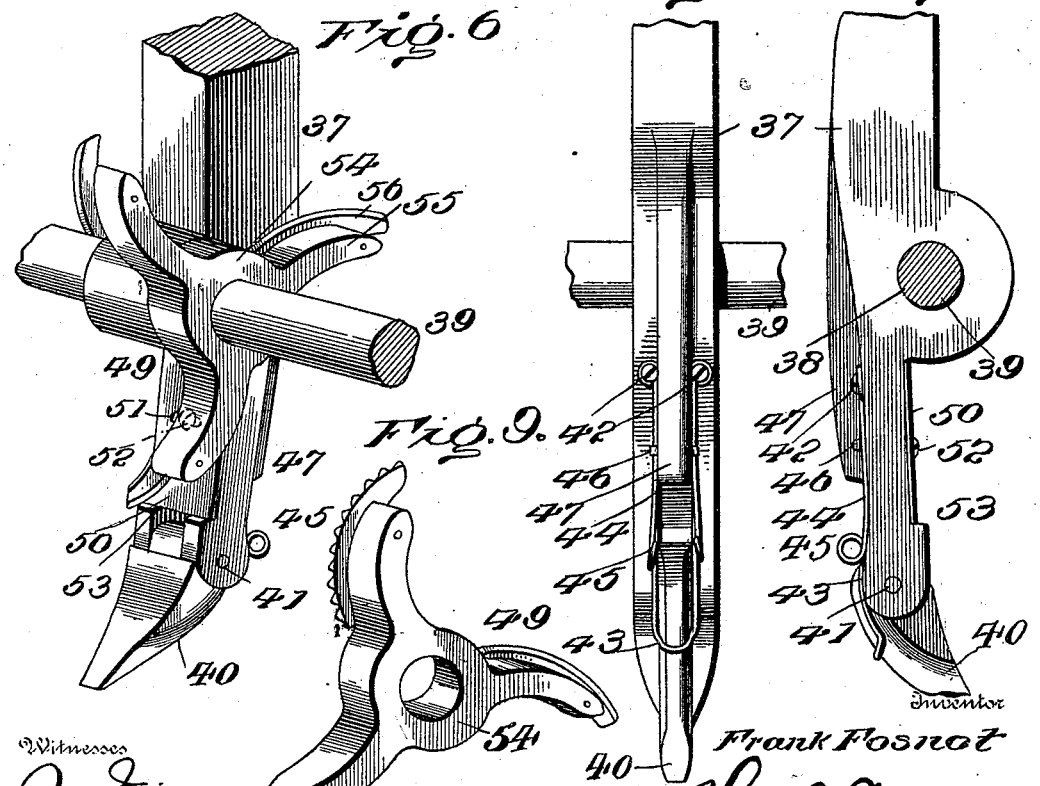

UNITED STATES PATENT OFFICE.

FRANK FOSNOT, OF DALEVILLE, INDIANA.

COMBINED STALK-CUTTER AND RAKE.

SPECIFICATION forming part of Letters Patent No. 642,597, dated February 6, 1900.

Application filed July 5, 1899. Serial No. 722,868. (No model.)

*To all whom it may concern:*

Be it known that I, FRANK FOSNOT, a citizen of the United States, residing at Daleville, in the county of Delaware and State of Indiana, have invented certain new and useful Improvements in a Combined Stalk-Cutter and Rake; and I do hereby declare the following to be a full, clear, and exact description of the invention, such as will enable others skilled in the art to which it appertains to make and use the same.

This invention relates to a rake and stalk-cutter, the purpose being the provision of an implement of this character which will be under the control of the driver at all times, so as to be thrown into and out of gear and enable the rake and cutting mechanism to be vertically adjusted to the required elevation, the operating-levers being disposed so as to be within convenient reach of the driver's seat.

For a full description of the invention and the merits thereof and also to acquire a knowledge of the details of construction of the means for effecting the result reference is to be had to the following description and the drawings hereto attached.

While the essential and characteristic features of the invention are necessarily susceptible of modification, still the preferred embodiment of the invention is illustrated in the accompanying drawings, in which—

Figure 1 is a top plan view of a machine for attaining the ends of this invention. Fig. 2 is a side elevation, the rake being lowered. Fig. 3 is a longitudinal section about on the line X X of Fig. 1, the rake being elevated. Fig. 4 is a transverse section on the line Y Y of Fig. 1. Fig. 5 is a front view. Fig. 6 is a perspective view of a rake-tool and the cutting mechanism coöperating therewith. Fig. 7 is a rear view of a rake-tool. Fig. 8 is a side view thereof. Fig. 9 is a detail perspective view of a rotary cutter.

Corresponding and like parts are referred to in the following description and indicated in all the views of the drawings by the same reference characters.

The implement comprises in its organization a wheel-frame and a draft-frame, the two being independently mounted upon the axle and having relative adjustable connection to admit of the rake and cutting mechanism being adjusted to the required elevation. The draft-frame comprises longitudinal bars 1 and cross-bars 2, the latter being rigidly attached at their ends to the longitudinal bars in advance of the axle. The pole or tongue 3 is disposed midway between the longitudinal bars 1 and is attached to the cross-bars 2 and overhangs the axle at its rear end. The seat 4 has the lower end of its standard attached to the rear portion of the pole or tongue and is disposed about in vertical line with the axle. The wheel-frame comprises side bars 5 and a transverse beam 6, the latter constituting a rake-head and being secured to the rear terminals of the side bars 5 and having its end portions projecting to a suitable distance beyond said side bars. The wheel-frame is loosely mounted upon the axle 7, so as to turn thereon to admit of the rake being raised or lowered. Flat springs 8 are placed against the lower faces of the bars 5 and are secured thereto a short distance from the extremities of said bars, said springs extending forward of the terminals of the bars 5 a short distance. Bifurcated lugs 9 are secured to the forward ends of the flat springs and project vertically therefrom. A shaft 10 is disposed transversely of the implement and is journaled in bearings applied to the front end of the draft-frame and has its end portions projecting beyond the sides of the bars 1 and overhanging the front portions of the springs 8. Collars 11 are secured to the projecting end portions of the transverse shaft and are formed with bifurcated arms 12, which are attached by means of links 13 with the bifurcated lugs 9. The shaft 10 is adapted to be rotated in its bearings, thereby changing the relation of the arms 12, so as to effect a vertical movement of the forward end of the wheel-frame and a corresponding movement of the rear end of said frame and the rake attached thereto. A toothed segment 14 is attached to the shaft 10 and meshes with a corresponding toothed segment 15, pivoted to the pole or tongue. A lever 16 is attached to the toothed segment 15 and extends within convenient reach of the driver's seat and is provided with a hand-latch 17 of ordinary construction to coöperate with a curved bar 18, secured at its ends to the pole and formed at intervals in its length with a series of openings to receive the interlocking end of the latch-bolt and secure the lever and parts coöperating therewith in the required adjusted position. When the latch-bolt is disengaged from the bar 18, the lever 16 can be moved forward or backward and effect a corresponding rotation of the shaft 10, so as to raise or lower the rake, as may be required.

By having the flat springs 8 secured at their rear ends to the side bars 5 a short distance from the front terminals of said bars said springs are enabled to have a limited play at their forward ends. Set-screws 19 pass loosely through openings formed in the flat springs 8 about midway of their ends, and coiled springs 20 are mounted upon the set-screws and are confined between the heads thereof and said springs and supplement the action of the latter in holding the rake elevated when thrown out of action or lifted from the ground. The tension of the springs 20 can be varied by turning the set-screws, so as to vary the distance between their heads and the springs 8.

The ground-wheels 21 constitute drivers and are secured to the spindles or end portions of the axle by a ratchet-and-pawl connection in the ordinary manner, so as to admit of their turning backward when backing the implement or when making a curve. A sprocket-wheel 22 is loosely mounted upon the axle 7 and is provided at one side with an annular grooved extension 23, which coöperates with a keeper 24, secured at one end to the axle and having its opposite end constructed to enter the annular groove 23 of the lateral extension of the sprocket-wheel. A half-clutch 25 is formed upon the opposite face of the sprocket-wheel and is adapted to coöperate with a corresponding half-clutch 26, slidable upon the axle and keyed to revolve therewith in any desired manner. The half-clutch 26 is normally acted upon by a spring 27, mounted upon the axle and confined between the half-clutch 26 and a collar 28, secured to the said axle. The half-clutch 26 is formed with an annular groove 29, which receives a fork 30 of a shipper-bar 31, the latter being attached to an operating-lever 32, having a hand-latch 33, which coöperates with a curved bar or plate 34, secured to the draft-frame and provided with a series of ratchet-teeth in its length to receive the engaging end of the latch-bolt 33. A guide-pin 35 projects from the inner end of the shipper-bar, parallel with the axis of the axle, and passes through an opening in a plate 36, attached to the pole or tongue 3. The purpose of the pin 35 and plate 36 is to hold the shipping device in proper position and direct it in its various movements. Upon moving the upper end of the lever 32 inward the half-clutch 26 will be disengaged from the half-clutch 25 of the sprocket-wheel 22, thereby throwing the machine out of action. When the lever 32 is released, the spring 27, reacting, will move the half-clutch 26 so as to throw it into engagement with the half-clutch 25, whereby the machine is thrown into action.

The rake-teeth 37 are secured at their upper ends to the transverse beam or rake-head 6 and are provided at a point intermediate of their upper and lower ends with eyes or openings 38, in which the shaft 39 of the rotary cutters obtains a bearing. The lower ends of the rake-teeth are bifurcated and have pivotal connection with points 40, the upper ends of the points being reduced to snugly fit within the spaces formed between the bifurcations of the teeth. A pin 41 pivotally connects each of the points 40 with the lower ends of the teeth and may be of wood or soft metal, so as to break when the points strike a root, boulder, or other unyielding obstruction, thereby preventing straining or injury to the implement. A spring coöperates with each tooth and the point thereof and is designed to hold the point in an operative position. This spring is of approximately U form and is constructed of a length of spring-wire doubled upon itself and having its terminals formed into eyes, which receive fastenings 42, and having the folded end deflected, as shown at 43, to receive a rib formed upon the rear side of the point 40. The side members 44 of the spring are bent to provide coils 45, which increase the resiliency of the spring. A pin 46 passes transversely through a rib 47, provided at the rear side of each tooth, and its end portions project beyond the sides of the rib and engage with the side members 44 of the spring and hold them close against the rear side of the tooth. The purpose of the springs is to permit the points 40 to yield when passing over an obstruction and to return the points to a normal or active position after the said obstruction has been cleared. When the points 40 move to the limit of their rearward throw and still fail to clear the obstruction, the pin 41 will break, thereby relieving the machine of excessive strain and preventing serious injury thereto.

The shaft 39 is mounted in the bearings 38, provided in the rake-teeth 37, and is strengthened by braces 48, secured at their front ends to the side bars 5 and having their rear ends apertured to admit of the passage therethrough of the cutter-shaft. A series of rotary cutters 49 are mounted upon the shaft 39 and coöperate with ledger-plates 50, secured to the front sides of the rake-teeth 37. These ledger-plates 50 are adjustable laterally and are formed with transverse slots 51, through which clamp-screws 52 pass. The ledger-plates 50 are seated against flat faces formed at the forward sides of the rake-teeth at a point below the bearings 38. In order to prevent turning of the ledger-plates upon the single clamp-screws 52, their upper ends abut against the bearings 38 and their lower ends abut against shoulders 53, formed by providing the seats for the said ledger-plates. The rotary cutters 49 consist of hub portions 54 and curved arms 55, to which curved blades or knives 56 are attached. These blades may have smooth cutting edges or may be toothed or bearded, as desired. By having the knives or blades 56 curved they are better adapted for the performance of the required work. The rotary cutters are disposed so as to throw the blades or knives in a spiral arrangement, whereby the best results are secured. The rotary cutters may be secured to the shaft 39 in any desired manner, so as to rotate therewith. The lateral adjustment of the ledger-plates 50 provides for compensating for wear due either to sharpening or the abrasive action of the coöperating cutters.

In the active operation of the machine the latter is drawn over a field in the usual manner, and when the rake is lowered the stalks are gathered by coming in contact with the rake-teeth. The cutters rotating and coöperating with the rake-teeth cut the stalks and the cut portions pass between the rake-teeth and are spread upon the field. The spring 8 permits the rake to rise and fall automatically, so as to adapt itself to the condition of the ground over which the implement is passing, thereby insuring a cutting of all the stalks within the range of the implement.

Having thus described the invention, what is claimed as new is—

1. In an agricultural implement of the class specified, the combination with the rake comprising a beam and a series of teeth, the latter having cutting edges at their lower ends terminating a short distance from their points, of rotary cutters journaled to the rake-teeth and located wholly within the extremities thereof and adapted to coöperate with their cutting edges, substantially as described.

2. In an agricultural implement of the type described, the combination with the rake, and ledger-plates applied to the rake-teeth between their ends, of rotary cutters journaled to the rake-teeth and operating wholly within the ends thereof jointly with the ledger-plates, substantially as specified.

3. In an agricultural implement of the character described, the combination with the rake, and a shaft common to the rake-teeth and journaled thereto midway of their ends, of cutters secured to said shaft and rotatable therewith against the sides of the rake-teeth, as and for the purpose set forth.

4. In an agricultural implement of the nature set forth, the combination with the rake, and a shaft journaled to the rake-teeth about midway of their ends, of cutters secured to the shaft and rotatable therewith within the extent of the rake-teeth, and ledger-plates applied to the rake-teeth and adjustable laterally toward and from the plane of the respective rotary cutters, substantially as specified.

5. In combination, a rake provided with teeth having bearings, and a shaft journaled in said bearings, of cutters secured to the said shaft and rotatable therewith, ledger-plates seated upon the front sides of the rake-teeth with their ends abutting against projecting portions thereof, and means for laterally adjustably connecting the ledger-plates with the rake-teeth, substantially as set forth.

6. In combination, a rake having its teeth formed with bearings, seats adjacent to the bearings, and shoulders at the lower ends of the seats, a shaft journaled in the bearings of the rake-teeth, rotary cutters applied to the shaft, ledger-plates placed upon the seats of the rake-teeth with their ends abutting against the bearings and shoulders, and clamp-screws for adjustably connecting the ledger-plates to the teeth, substantially as set forth.

7. In an implement of the character described, a rake having its teeth provided with movable points, and a spring for normally holding said points in a predetermined position, in combination with ledger-plates applied to the teeth above the movable points, and rotary cutters journaled to the teeth and coöperating with the ledger-plates, substantially as set forth.

8. In an implement of the type set forth, a rake-tooth provided with a pivot-point having a rib upon its rear side, in combination with a spring formed of a single length of spring-wire doubled upon itself and secured to the rake-tooth and having its folded end deflected to form a seat for the rim of the pivot-point, substantially as set forth.

9. In an implement of the character set forth, the combination with a rake-tooth having a rearwardly-extending rib, and a point pivoted to the rake-tooth, of a spring comprising side members secured to the rake-tooth at the sides of the rib and having engagement with the pivot-point, and projections at the sides of the said rib confining the side members of the spring to the rake-tooth, substantially as set forth.

10. In an implement of the class described, the combination with a rake-tooth having a rearwardly-extending rib and a point pivoted to the rake-tooth, of a spring comprising side members secured to the rake-tooth at the sides of the rib and engaging with the pivot-point, and a pin passing through the rib of the rake and having its end portions engaging said side members of the spring, substantially as set forth.

11. In an implement of the character described, the combination with draft and wheel frames mounted to have relative adjustment, a shaft journaled upon one of the frames, arms secured to said shaft, links connecting the outer ends of the arms with the other frame, and means for rotating the shaft in its bearings and holding it in an adjusted position, substantially as set forth.

12. In an implement of the character described, the combination with the draft-frame, and a relatively movable wheel-frame, of a shaft mounted upon one of the frames and provided with offstanding arms, links connecting said arms with the other frame, a toothed segment secured to the shaft, a companion toothed segment intermeshing with the toothed segment of the shaft, an operating-lever secured to the toothed segment meshing with the segment of said shaft, and means for securing the operating-lever in an adjusted position, substantially as set forth.

13. In combination, a draft-frame, and a relatively adjustable frame, of flat springs secured to the adjustable frame and projecting therefrom, and adjustable connections between the projecting ends of the springs and the draft-frame, substantially as set forth.

14. In combination, a draft-frame, and a relatively adjustable wheel-frame, of flat springs secured at one end to the wheel-frame and having projecting end portions, and rigid connections adjustably interposed between the projecting ends of said springs and the draft-frame, substantially as set forth.

15. In combination, a draft-frame and a relatively adjustable wheel-frame, and means for adjustably connecting the wheel-frame with the draft-frame, of supplemental tension devices interposed between the wheel-frame and the aforesaid connections, substantially as set forth.

16. The combination with a draft-frame and a relatively adjustable wheel-frame, of springs secured to the wheel-frame and having projecting end portions, adjustable connections between the projecting end portions of the springs and the draft-frame, and tension devices between the wheel-frame and the said springs, substantially as described.

17. The combination with a draft-frame and a wheel-frame, of springs attached to the wheel-frame and having projecting end portions, adjustable connections between the projecting end portions of the springs and the draft-frame, and other springs between the wheel-frame and the flat springs, substantially as specified.

18. In combination, a draft-frame and a relatively adjustable wheel-frame, flat springs secured at one end to the wheel-frame and having their opposite end portions projecting, and adjustable connections between the draft-frame and the projecting end portions of the said springs, of set-screws applied to the wheel-frame, and springs interposed between said set-screws and flat springs, and having their tension regulable by means of the set-screws, substantially as set forth.

In testimony whereof I affix my signature in presence of two witnesses.

FRANK FOSNOT. [L. S.]

Witnesses:
MARCELLUS A. CHIPMAN,
SANFORD M. SETTNER.